United States Patent [19]

Hussauf

[11] Patent Number: 4,584,723
[45] Date of Patent: Apr. 29, 1986

[54] FITTING FOR CONNECTING A PLUMBING FAUCET TO PLUMBING PIPES

[76] Inventor: Walter Hussauf, Fistelstrasse, CH-8497 Fischenthal, Switzerland

[21] Appl. No.: 619,618

[22] Filed: Jun. 11, 1984

[30] Foreign Application Priority Data

Jun. 29, 1983 [CH] Switzerland ............... 3557/83

[51] Int. Cl.[4] ............................................. F16K 25/00
[52] U.S. Cl. ...................................... 4/192; 137/625.4; 137/625.41; 137/270; 285/249
[58] Field of Search ............. 4/192; 137/625.17, 625.4, 137/625.41, 375, 356, 270; 285/248, 249, 354

[56] References Cited

U.S. PATENT DOCUMENTS

| | | | |
|---|---|---|---|
| 1,171,551 | 7/1913 | Stephens | 285/249 |
| 1,224,638 | 8/1912 | Hewitt | 285/249 |
| 2,405,822 | 8/1946 | Franck | 285/232 |
| 2,434,846 | 1/1948 | Hagan | 285/232 X |
| 2,440,178 | 9/1945 | Lofquist | 285/249 |
| 2,448,888 | 9/1948 | Hynes | 285/232 |
| 3,188,122 | 6/1965 | Smith | 285/249 |
| 3,416,568 | 12/1968 | Parr | 4/192 X |
| 3,570,537 | 3/1971 | Kelly . | |
| 3,674,048 | 7/1972 | Manoogian et al. | 137/625.41 |
| 3,750,708 | 8/1973 | Staat et al. | 137/625.17 |
| 3,870,080 | 3/1975 | Landwehr | 137/625.17 X |
| 3,913,602 | 10/1975 | Yoon | 137/375 |
| 3,957,293 | 5/1976 | Rodgers | 285/249 |
| 4,005,728 | 1/1977 | Thorp | 137/270 |
| 4,032,177 | 6/1977 | Anderson | 285/249 |
| 4,157,099 | 6/1979 | Pelker et al. | 137/625.17 |
| 4,236,736 | 12/1980 | Anderson | 285/248 |
| 4,352,369 | 10/1982 | Lorch | 137/270 |
| 4,362,186 | 12/1982 | Parkison et al. | 137/625.4 |
| 4,378,029 | 3/1983 | Parkison | 137/625.4 |
| 4,397,330 | 8/1983 | Hayman | 137/625.41 X |
| 4,423,752 | 1/1984 | Psarouthakis | 137/270 |

FOREIGN PATENT DOCUMENTS

| | | | |
|---|---|---|---|
| 0119960 | 9/1984 | European Pat. Off. | 4/192 |
| 2307617 | 8/1973 | Fed. Rep. of Germany | 4/191 |
| 3148187 | 7/1982 | Fed. Rep. of Germany . | |

Primary Examiner—Stephen Marcus
Assistant Examiner—L. J. Peters
Attorney, Agent, or Firm—W. G. Fasse; D. H. Kane, Jr.

[57] ABSTRACT

A faucet, such as a mixing valve (32), is connected to plumbing pipes through a fixture (7) adjustably received in a bore (19) of a fitting member (4) mounted in a housing (5). The position adjustable fixture (7) has two longitudinal ducts (28, 30) provided with duct inlets (36, 38) opening into ring grooves (37, 39). Sealing rings (40) on the fixture separate the duct inlets and grooves in pairs for keeping cold and hot water apart upstream of the mixing valve. The duct inlets communicate through ports (45, 47) with chambers (12, 14) in the fitting member. The chambers in turn are connected to the plumbing pipe to provide a separate through flow connection between the pipes and the mixing valve separately for the hot and cold water. This structure permits rotation of the housing (5) about its central axis which coincides with the longitudinal axis of the fixture, so that the housing may be mounted in selectable, rotationally adjusted positions to a wall while maintaining the separate through flow connections through the ducts.

12 Claims, 29 Drawing Figures

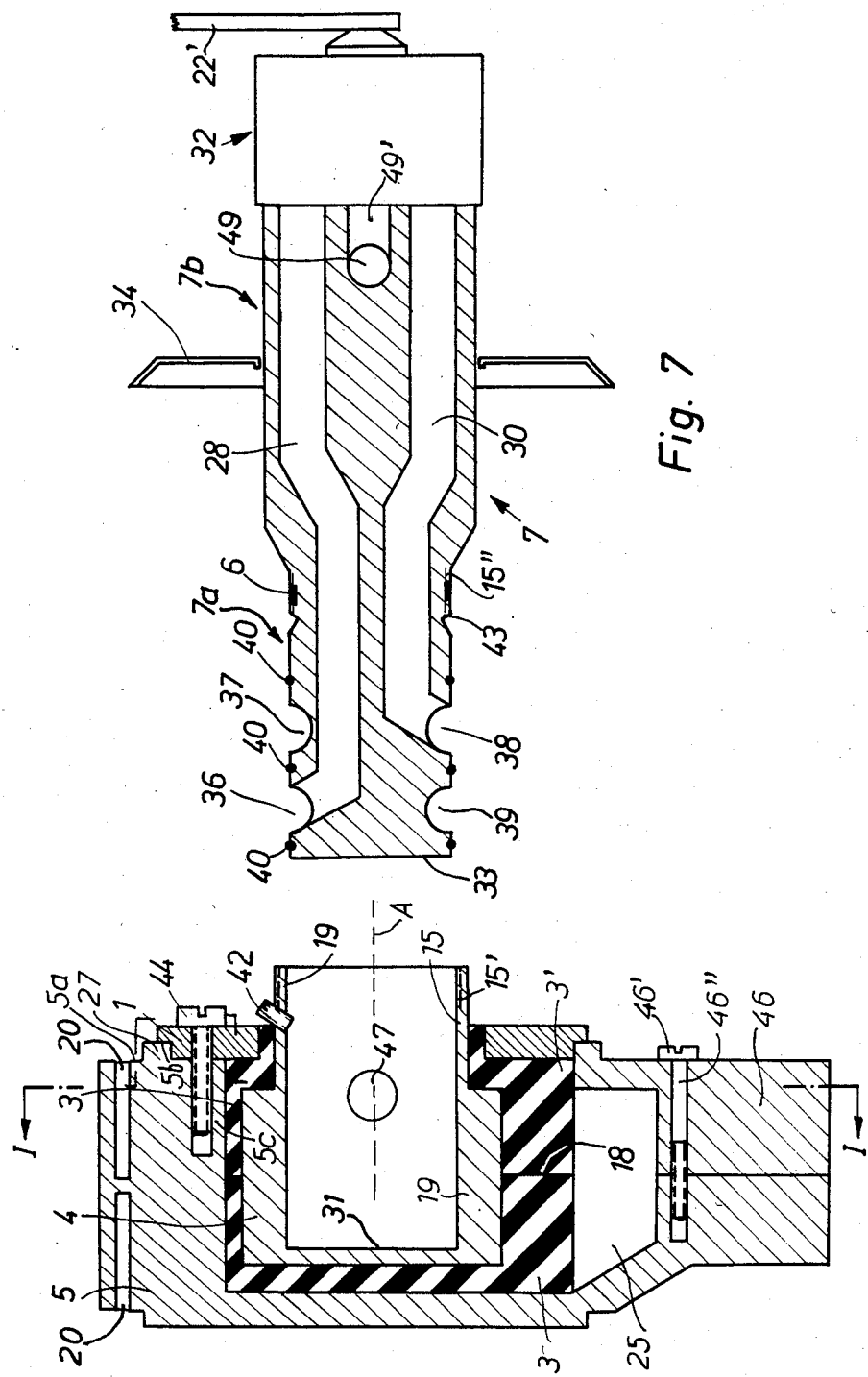

FITTING FOR CONNECTING A PLUMBING FAUCET TO PLUMBING PIPES

FIELD OF THE INVENTION

The invention relates to a fitting for connecting a plumbing faucet to plumbing pipes. More specifically, such fittings are equipped with a fitting member having cold and hot water connecting pipe sections in a housing, whereby the fitting member holds or receives a fixture, also referred to as armature. The fixture is provided with separate cold and hot water channels supplying the hot and cold water to a mixing valve or the like.

DESCRIPTION OF THE PRIOR ART

Known fixtures or armatures are so constructed that the concealed plumbing pipes, which are for example installed inside a wall, supply the cold and hot water to a surface mounted fixture or armature. Such surface mounted fixture supplies the water to a so-called mixing battery or faucet which in turn leads into a sink or the like.

In a conventional plumbing installation, the cold and hot water supply pipes leading to a fixture are branched off from two respective mains or plumbing pipes. Such branching frequently requires that two supply pipes must cross each other and, depending on the particular installation, relatively long supply pipes or branch lines are required. Additionally, conventionally available fixtures are so constructed that the supply pipes leading to the fixtures must be located in determined positions so that the connecting pipe sections forming part of a fitting may be installed in their proper positional orientation, namely so that, for example, a discharge or outlet points exactly downwardly. Further, local plumbing codes require that the cold water must be uniformly supplied to one side of a fixture, while the warm water must be always supplied to the other side of that fixture.

OBJECTS OF THE INVENTION

In view of the foregoing, it is the aim of the invention to achieve the following objects singly or in combination:

to construct a plumbing fitting in such a way that neither the hot and cold water supply or branching pipes nor the main plumbing pipes will require any crossing over, thereby simplifying the installation;

to construct the housing of a plumbing fitting in such a way that the housing may take up any desired rotational or angular position relative to a central housing axis extending perpendicularly to a wall to which the armature or fixture is secured or mounted;

to avoid the difficulties which have been encountered heretofore in the installation of plumbing fixtures or armatures when satisfying plumbing code requirements that the hot and cold water faucet handles must always be located on a prescribed side of an armature or fixture;

to assure the accessibility of the plumbing pipe ends for an easy mounting of the plumbing fitting in subsurface plumbing installations and to thereby also facilitate repair work;

to construct a plumbing fitting in such a way that it is equally useful for connecting to metal piping or to piping made of synthetic plastics material;

to construct a plumbing fitting so that hot and cold water pipes may not only be separately connected to inlets of the fitting, but also to provide outlets from the fitting so that the piping may extend on both sides of the fitting;

to make the plumbing fitting independent of the fact on which side of the fitting the hot and cold water plumbing pipes are located, or at what angle the hot and cold water plumbing pipes lead to the fitting;

to construct the fitting so that it provides at least one additional outlet port for a hand held spray or showerhead or the like; and to easily change or switch over component parts of a fixture or armature for changing a hot water flow channel to a cold water flow channel and vice versa.

SUMMARY OF THE INVENTION

According to the invention the plumbing fitting comprises a housing into which a fitting member is inserted. The fitting member has a bore in which a plumbing fixture or armature is held in a rotatable and adjustable manner. The fixture has cold and hot water ducts with respective duct inlets communicating separately with hollow chambers in the fitting member. The duct inlets of the fixture are displaced axially relative to each other along a central axis which is common to the housing, to the fitting member, and to the fixture. The duct inlets are sealed from each other for separate cooperation with the chambers in the fitting member. This type of structure permits a relative angular adjustment between the components of the fitting, including the housing, the fitting member, and the fixture, whereby the cold and hot water plumbing pipes and any branching pipes may be installed without any crossing over, whereby all pipes may be kept optimally short. This construction also avoids any confusion for the installer when installing the fixtures, expecially in connection with mixing batteries and a wrong connection, as far as plumbing codes are concerned, is virtually impossible.

Yet another advantage of the invention is seen in that the present plumbing fitting may be used to provide through-going conduits or channels in the plumbing piping, whereby any crossing over in the piping from one fixture to the other is avoided.

Further, the provision of additional channels for supplying mixed water to a hand held shower or to a foot shower is easily accomplished, as will be described in more detail below.

BRIEF FIGURE DESCRIPTION

In order that the invention may be clearly understood, it will now be described, by way of example, with reference to the accompanying drawings, wherein:

FIG. 6 is a sectional view along section line VI—VI in FIG. 1 showing the pressure sealing ring and the cover in section;

FIG. 7 is a longitudinal section through the fixture or armature.

DETAILED DESCRIPTION OF PREFERRED EXAMPLE EMBODIMENTS AND OF THE BEST MODE OF THE INVENTION

Figure 1:
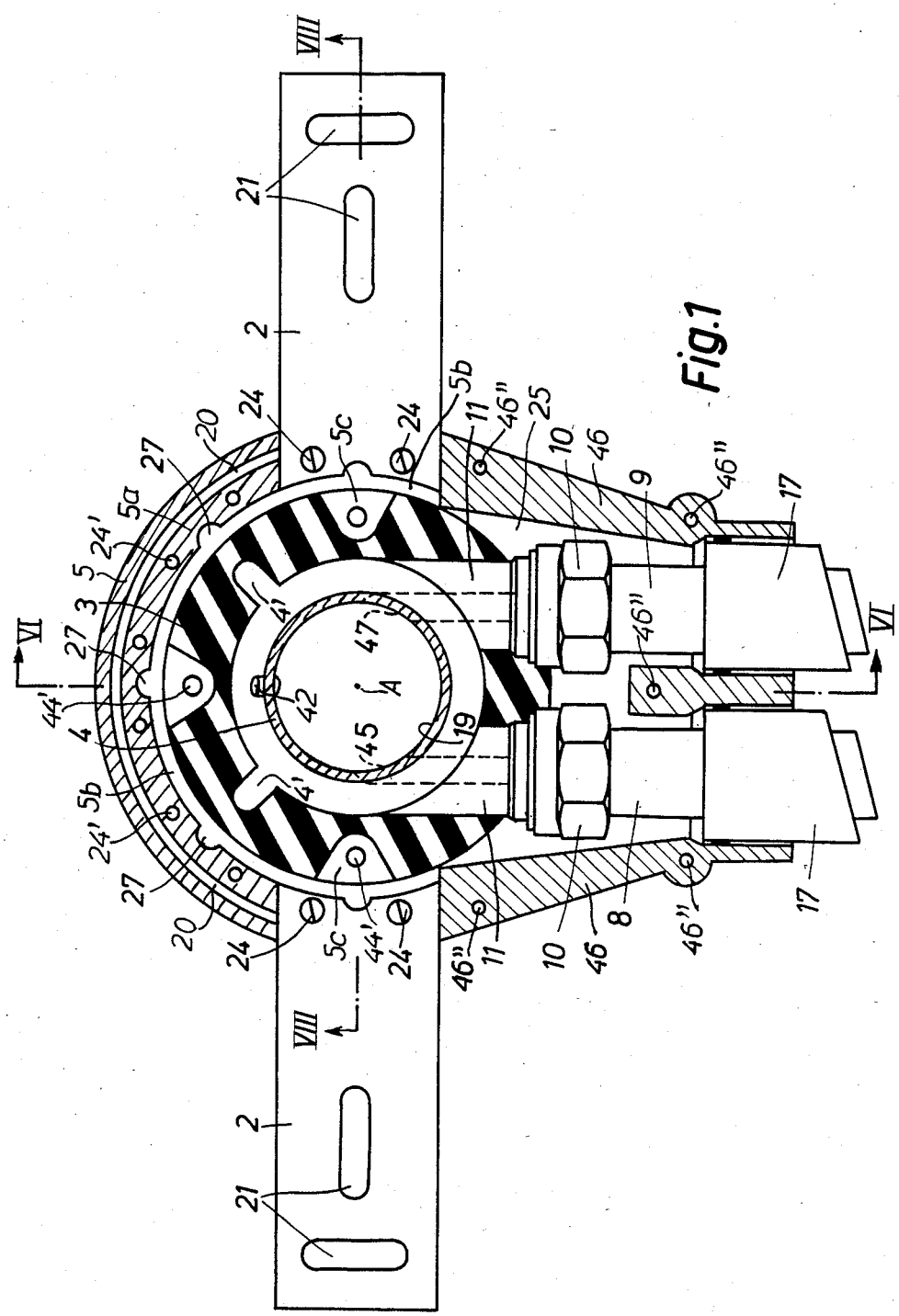
FIG. 1 is a sectional view through a plumbing fitting according to the invention along section line I—I in FIG. 6 with a pressure sealing ring removed and with part of a cover shown in section.

FIG. 1 shows a front view, partially in section, of a first embodiment of a plumbing fitting according to the invention for connection to cold and hot water main plumbing pipes 8 and 9. The water is supplied through connecting pipe sections 11 and 11' to an armature, such as shown in FIG. 7, to be described in detail below. Both pipe sections 11, 11' are integral parts of a fitting member 4.

The hot and cold water mains or plumbing pipes 8, 9 are enclosed by tubular pipe insulation 17 for providing simultaneously a noise and heat insulation. The water-tight connection between the water pipes 8, 9 and the pipe sections 11, 11' is accomplished with a conventional sleeve nut 10. The fitting member 4 with its integral pipe sections 11, 11' is a sleeve type, partially hollow body received in a housing 5 cushioned by insulating shells 3, 3'. Referring to FIG. 6, preferably, first the shell 3 is inserted into a cavity 25 of the housing 5. Then the fitting member 4 is inserted into the shell 3, whereupon the second shell 3' is inserted around the fitting member 4 all substantially concentrically relative to a central axis A which is common to the housing 5, the fitting member 4, and a fixture 7 shown in FIG. 7. As shown in FIG. 1, the fitting member 4 has lobes 4' engaging into respective recesses in the shells 3, 3' for a proper fit. A pressure ring 1 is secured to the front of the housing 5 by screws 44 to press the shells 3, 3' together and hold the fitting member 4 in place.

Figure 3:
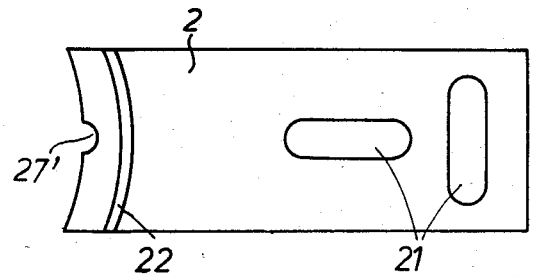
FIG. 3 is a plan view of a strap for mounting the present plumbing fitting in or on a wall.
Figure 4:
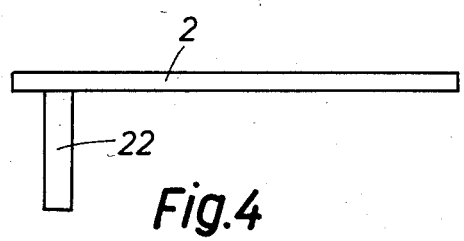
FIG. 4 shows a side view of the mounting strap according to FIG. 3.

The housing 5 has circular grooves 20 as shown in FIGS. 1 and 6 for receiving a respectively curved bow section 22 of a mounting strap 2 shown in FIGS. 3 and 4. Radially inwardly next to the groove 20 there is a housing section 5a with threaded holes 24' which receive screws 24 for securing one or two straps 2 to the housing 5 as shown in FIG. 1. These holes 24' are so spaced relative to each other that any pair of two adjacent holes may be used for securing a strap in a plurality of different angular positions around the housing 5, whereby the housing 5 may be mounted to a wall with the aid of longitudinal aperatures 21 in the straps 2, also in any one of a plurality of such angular positions.

Radially inwardly of the housing section 5a there is a housing ring 5b with radially outwardly pointing cams 27 for engaging a respective recess 27' in the strap 2 as shown in FIG. 3. The number of cams 27 will determine the number of angular positions. One cam 27 may be provided for each pair of adjacent holes 24'.

Figure 2:
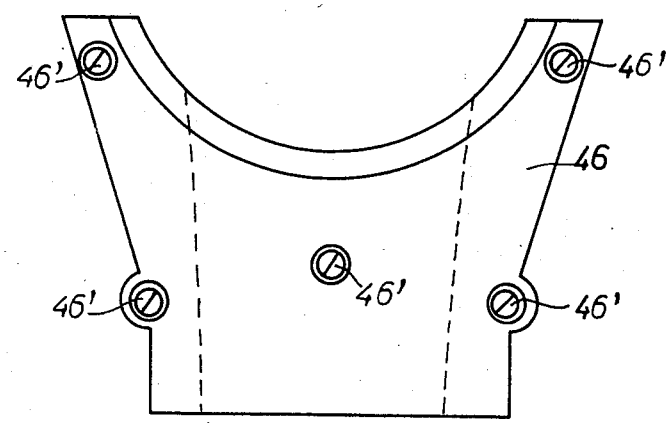
FIG. 2 is a plan view of the cover only part of which is shown in FIG. 1.

FIG. 2 shows a cover 46 for closing the lower portion of the housing 5. The cover 46 is secured to the housing 5 by screws 46' extending into threaded holes 46''.

Figure 5:
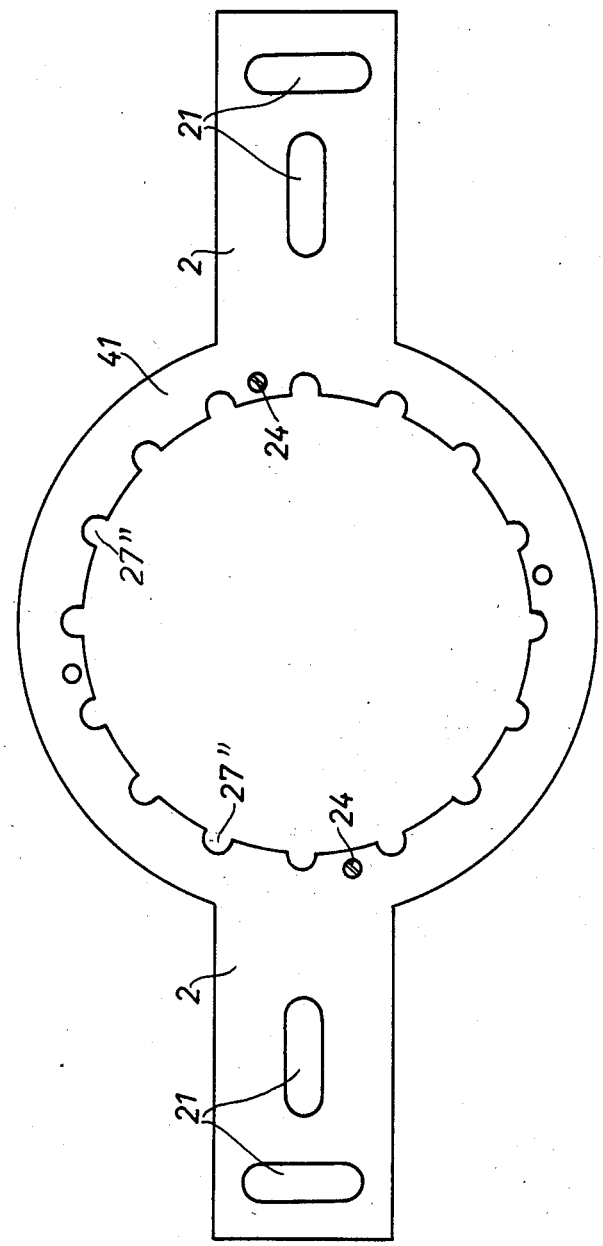
FIG. 5 is a plan view of a mounting ring for the present plumbing fitting, whereby the ring is provided with mounting straps.

FIG. 5 illustrates a modified mounting assembly for the housing. Here, the mounting straps 2 form integral parts of a mounting ring 41 with radially inwardly facing recesses 27'' cooperating with the cams 27 of the housing ring 5b. Here again, the ring 41 with its straps 2 can be rotated relative to the housing 5 or vice versa to assume any one of said plurality of angular positions.

Referring in conjunction to FIGS. 1, 6, 7 and 8, the fitting member 4 comprises two hollow chambers 12 and 14 which communicate with the connecting pipe sections 11, 11' seen in FIG. 1, through port holes 47 and 45 respectively. The chambers 12 and 14 are separated from one another in a fluid tight manner inside the fitting member 4. Additionally, these chambers 12 and 14 with their port holes 47, 45 may be axially displaced along the central axis A and relative to the bore 19 in the fitting member 4 which also comprises a reduced diameter section 15 having an internal threading 15' for cooperation with an external threading 15" of the fixture 7 shown in FIG. 7 when the fixture 7 is inserted into the bore 19 of the fitting member 4. Thus, when the fixture 7 is inserted in the bore 19, water in the chambers 12 and 14 cannot mix because of the sealing rings 40 around the fixture 7. The housing 5 which receives the fitting member 4 inside the insulating shells 3, 3' as described above, is suitable for an above surface or below surface concealed mounting, whereby the reduced diameter section 15 of the fitting member 4 extends out of the housing 5 and through the pressure sealing ring 1 in both types of installation. The above mentioned insulating shells 3, 3' may be made of elastic material, for example, rubber or foamed synthetic material. By dividing the shells 3, 3' along a separation plane 18 extending in parallel to the housing facing side, it is possible to install the components 3, 4, 3' in the housing cavity 25 in the above mentioned sequence. The pressure sealing ring 1 closes the housing and the screws 44 which secure the pressure sealing ring 1 to the housing extend into the holes 44' located in radially inwardly pointing ridges 5c which simultaneously reach into respective valleys of the shells 3, 3' to thereby prevent any rotation of these shells inside the housing 5. The pressure sealing ring 1 rests with a flange portion on the housing ring 5b provided with the cams 27.

Incidentally, as seen, for example in FIG. 6, a second circular groove 20 is provided in the housing 5 and faces in the direction opposite to the groove 20 so that the bow sections 22 of the straps 2 may also be inserted into the second groove 20, thereby facing in a direction opposite to that when inserted into the groove 20. Thus, depending on the installation requirements, the straps or mounting assembly may be used selectively on the front side of the housing 5 or the backs side thereof. Furthermore, suitable angular spacings between the cams 27 may be, for example, 30° or even 45°, if desired, even a single mounting strap 2 may be used. In any event, the housing will be provided with the necessary threaded holes on the front and/or rear side for the screws 24 by means of which the strap 2 or the ring 41 with its straps 2' is secured to the front or rear side of the housing 5.

For connecting plumbing pipes of synthetic material with the connecting pipe sections 11, 11' it is possible to withdraw the fitting member 4 entirely out of the housing 5 because of the separation plane 18 as described above. Thus, the present plumbing fitting is suitable for connection to metal plumbing pipes 8, 9, especially made of copper or it may be used for connection to plumbing pipes of synthetic materials. The housing 5 itself may either be made of metal or synthetic materials.

Due to the location of the sectional plane I—I in FIG. 6, only side portions of the cover 46 are visible in FIG. 1 and the pipes 8, 9 along with the connecting pipe sections 11, 11' are exposed to the view. Accordingly, it is clear that upon the removal of the cover 46, these pipe sections and pipes are freely accessible for tightening or loosening the sleeve nuts 10 so that, for example, a leaking pipe may be exchanged without any need for removing the entire housing 5.

Referring to FIG. 7, the fixture 7 is constructed for insertion into the bore 19 of the fitting member 4. The fixture 7 comprises a water distribution section 7a which is received in the bore 19 and a cylindrical body 7b which is located outside a wall surface. Two ducts 28 and 30 extend longitudinally through both fixture sections 7a, 7b for supplying cold and hot water to a conventional mixing valve 32 that may be opened and closed by a handle 22'. Mixed water passes out of the mixing valve 32 into a duct 49' and out through a discharge port 49. Two duct inlet ports 36 and 38 axially displaced relative to each other are provided in the insert or water distribution section 7a of the fixture 7. The first duct inlet 36 communicates with the duct 28. The second duct inlet 38 communicates with the duct 38. Each duct inlet 36, 38 opens into its respective ring groove 39, 37 which are sealed relative to each other by sealing rings, such as 0-rings 40. The ring grooves 37, 39 and thus the duct inlets 38, 36 communicate with the ports 47 and 45 in the fitting member 4 and thus also with the hollow chambers 12 and 14 respectively and through these chambers and the connecting pipe sections 11, 11' with the pipes 8, 9. With the aid of the 0-rings 40 in combination with the just described structure it is assured that the hot and cold water remains separated until it reaches the mixing valve 32. Further sealing means 6 are preferably inserted adjacent to or in the cooperating threadings 15', 15" of the fitting member 4 or fixture 7.

Once the fixture 7 is properly inserted into the bore 19 of the fitting member 4 and rotationally adjusted with regard to the desired discharge direction of the discharge port 49, it is fixed in place by one or several set screws 42 reaching into a ring groove 43 of the fixture 7. Preferably, the set screws 42 are directed at an angle as shown to facilitate their installation. A decorative cover 34 which is slidable back and forth along the cylindrical section 7b of the fixture 7 is then pushed into a position against a wall or the like to cover the front side of the housing as is conventional. Incidentally, the mixing valve 32 is of conventional construction and the lever 22' may be used for selecting the desired temperature of the mixed water and for the volume control. For this purpose the fixture 7 does not need to move axially because the mixing valve 32 comprises conventionally the means for the volume and temperature control.

Rather than placing the ring grooves 37 and 39 in the fixture 7, these ring grooves may also be provided inside the fitting member 4 for communicating the ports 45, 47 with the duct inlets 36 and 38. The sealing rings 40 could be located either as shown in FIG. 7, or they could be located inside the bore 19 of the fitting member 4. In any event, the insert section 7a for distributing the water will be so dimensioned that its facing end 33 reaches all the way to the bottom 31 of the fitting member 4.

Figure 9:
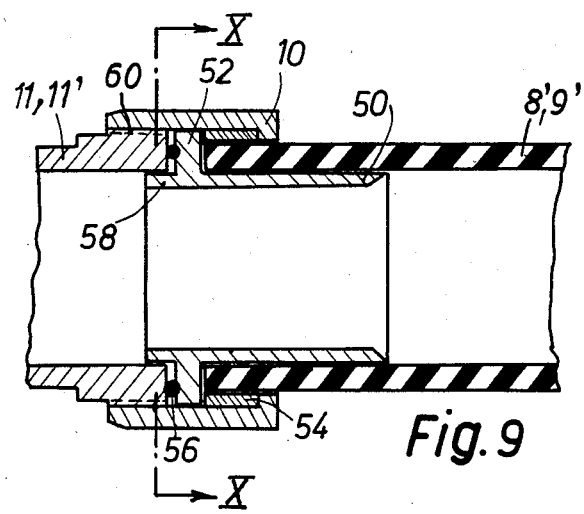
FIG. 9 is a sectional view through a hose connector structure for securing a flexible pipe or hose to a connecting pipe section of the fitting member.
Figure 10:
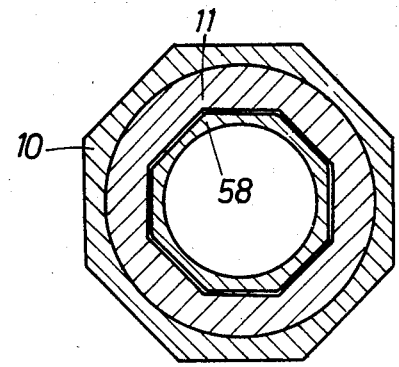
FIG. 10 is a sectional view along section line X—X in FIG. 9.

FIGS. 9 and 10 illustrate a hose connector for securing a plumbing pipe 8', 9' of plastic material to the connecting pipe sections 11, 11'. The illustrated pipe connector is constructed to avoid applying a torque load to the pipe of plastic material when the sleeve nut 10 is tightened. For this purpose the hose connector comprises an insert bushing 15 which is inserted into the free end of a plumbing pipe 8', 9' and which has an extension section 58 fitting into the free end of the connecting pipe section 11, 11'. A radially outwardly extending flange 52 is located between the extension section 58 and the insert section so that a sealing ring 56 may be pressed against the facing end of the connecting pipe section by the flange 52 when the sleeve nut 10 is tightened as it engages an outer threading 60 on the connecting pipe section 11, 11'. The sealing ring 56 may, for example, be an 0-ring. A slotted, somewhat conical clamping bushing 54 is inserted inside the sleeve nut 10 around the outer surface of the plastic pipe 8', 9' for tightly securing the free end of the plastic pipe to the insert sleeve.

The application of a torque to the plastic pipe is avoided by making the internal diameter of the connecting pipe section 11, 11' and the external diameter of the extension section 58 to have a shape other than circular, for example, hexagonal or octagonal. Since the plastic pipes 8', 9' are somewhat flexible, it is possible to secure the pipe connector even after the housing 5 has been rigidly installed. Similarly, when maintenance or repair work is to be performed, it is possible to easily exchange the pipes 8', 9' without totally removing the housing 5. This is especially advantageous in connection with concealed plumbing installations.

Figure 11:
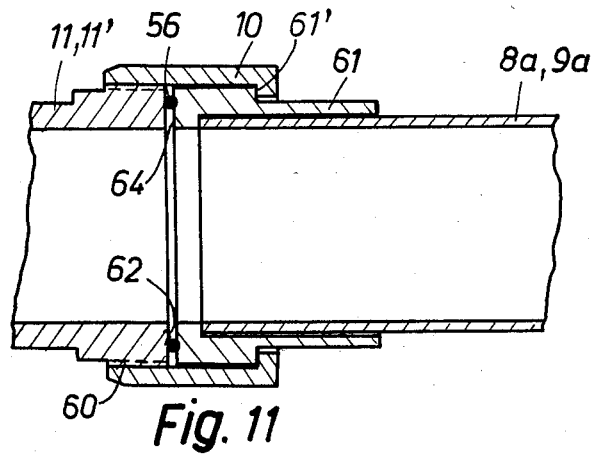
FIG. 11 is a sectional view similar to that of FIG. 9, showing a structure for the connection of a metal plumbing pipe to the connecting pipe section of the fitting member.

The pipe connector of FIG. 11 is intended for securing metal piping 8a, 9a to a connecting pipe section 11, 11'. A metal sleeve 61 is soldered to the free end of the metal plumbing pipe 8a, 9a and the sealing ring 56, such as an O-ring, is inserted between the facing end 62 of the connecting pipe section and the facing end of the sleeve 61. The sleeve nut 10 engages with its inwardly reaching flange an outwardly extending shoulder 61' of the sleeve 61 and is tightened on the outer threading 60 of the connecting pipe section 11, 11'. The hose connectors shown in FIGS. 9, 10 and 11 make it possible to connect either metal pipes or plastic pipes to the same connecting pipe sections 11, 11' which simplifies the maintenance of a pipe supply stock.

Figure 13:
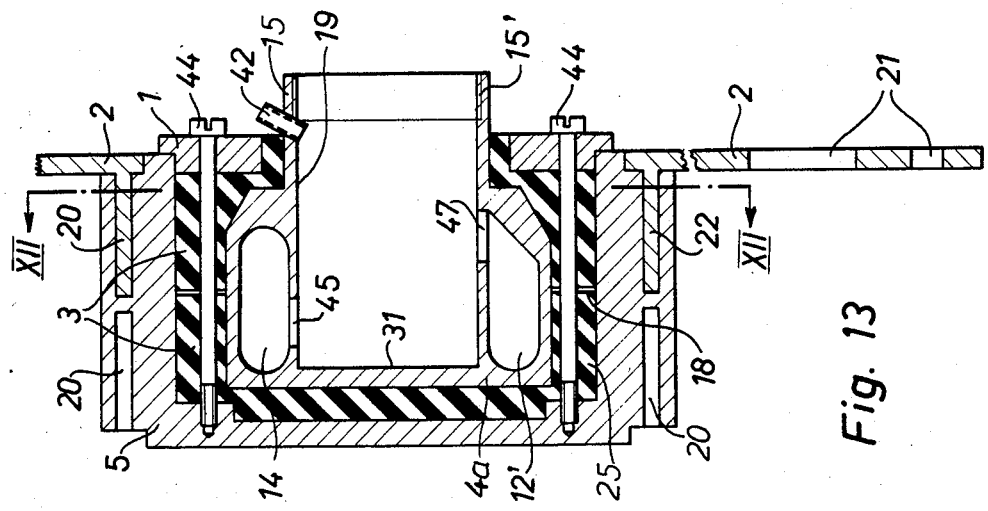
FIG. 13 is a sectional view along section line XIII—XIII in FIG. 12.
Figure 8:
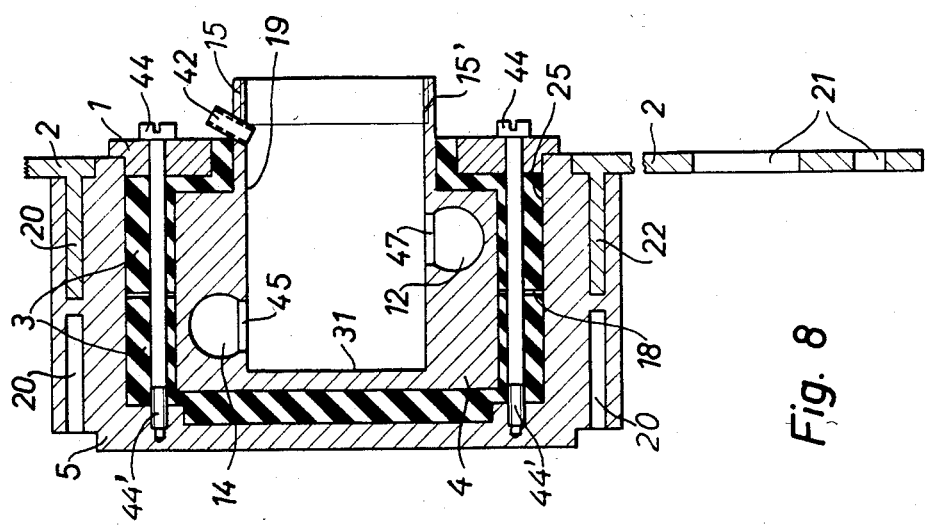
FIG. 8 is a sectional view along section line VIII—VIII in FIG. 1.
Figure 12:
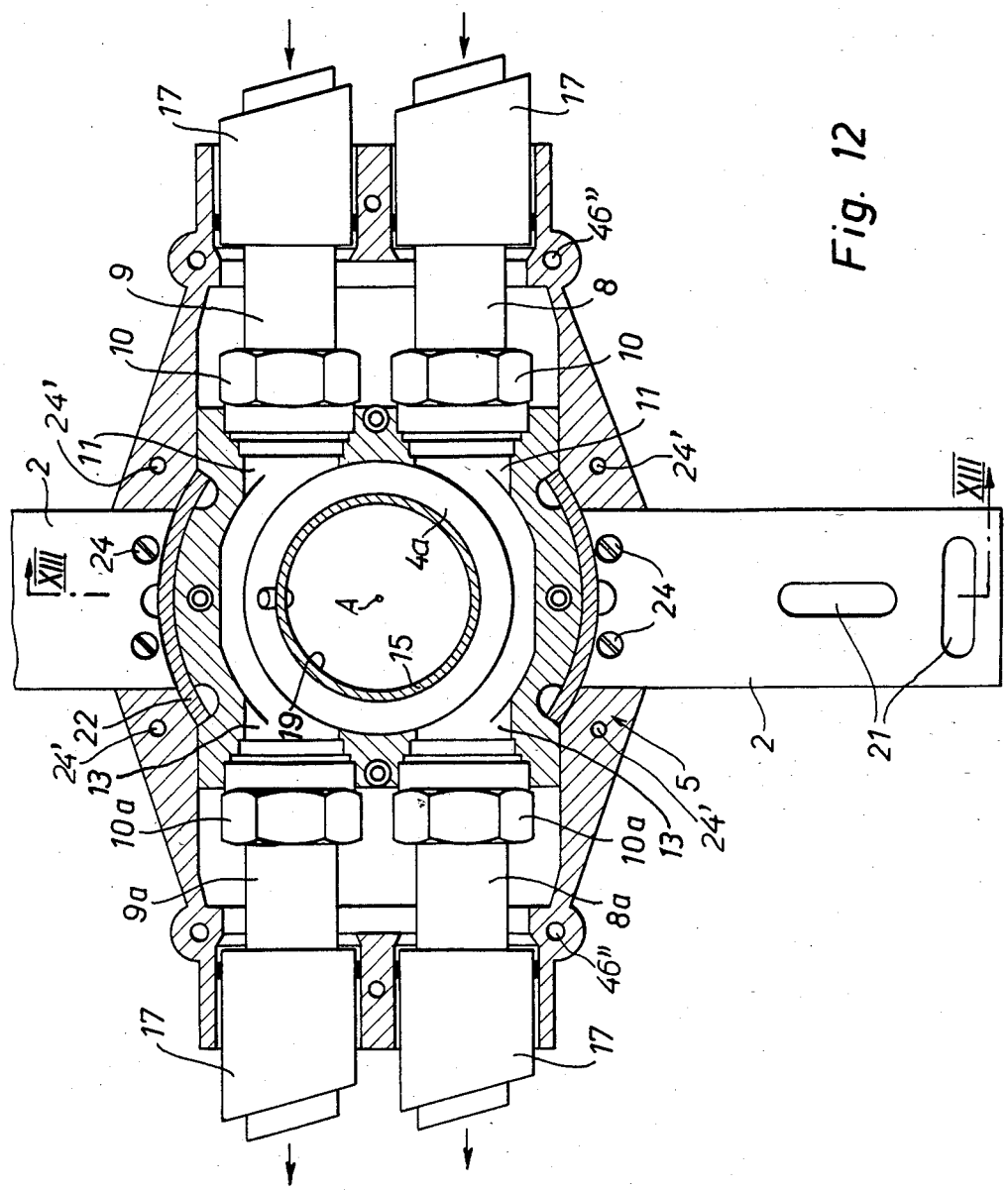
FIG. 12 is a sectional view along section line XII—XII in FIG. 13 showing a modification of the present fitting adapted for connection to inflow and outflow plumbing pipes, whereby the pressure sealing ring is not shown.

The embodiment shown in FIGS. 12 and 13 differs from the embodiment of FIG. 1 in that the fitting member 4a comprises, in addition to the two inlet connecting pipe sections 11, 11' also two outlet connecting pipe sections 13 and 13' so that the cold water, as well as the hot water, may completely pass through the fitting member, for example, to supply the hot and cold water to the next fixture. The hollow chambers 12' and 14' have a somewhat elongated cross-section as best seen in FIG. 13 so that these chambers may extend around the bore 19 in the fitting member 4a in a bowshaped manner from the pipe sections 11, 11' to the pipe sections 13, 13'. Otherwise, the construction of FIGS. 12 and 13 corresponds to that in FIGS. 1 to 8 and the same components are provided with the same reference numbers. In FIG. 12 a cover similar to that shown in FIG. 2 will be used in duplicate, one on each side of the straps 2.

Figure 14:
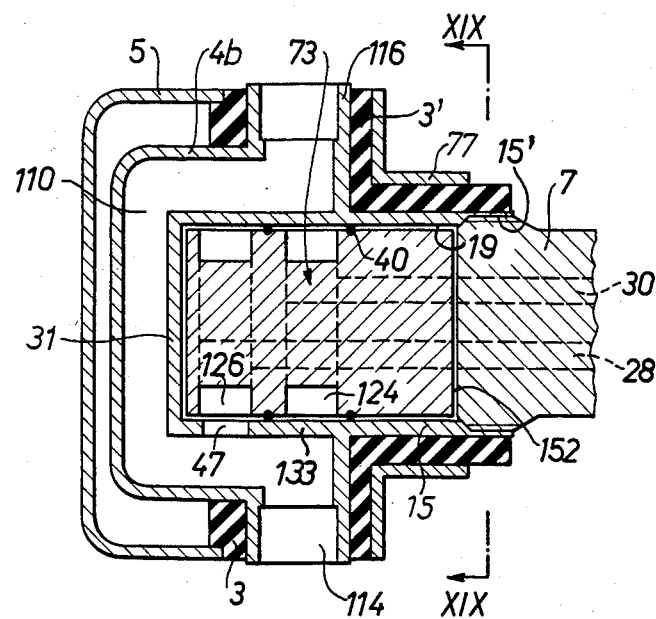
FIG. 14 is a sectional view along section line XIV—XIV in FIG. 19, showing an embodiment also for connection to inflow and outflow plumbing pipes.
Figure 15:
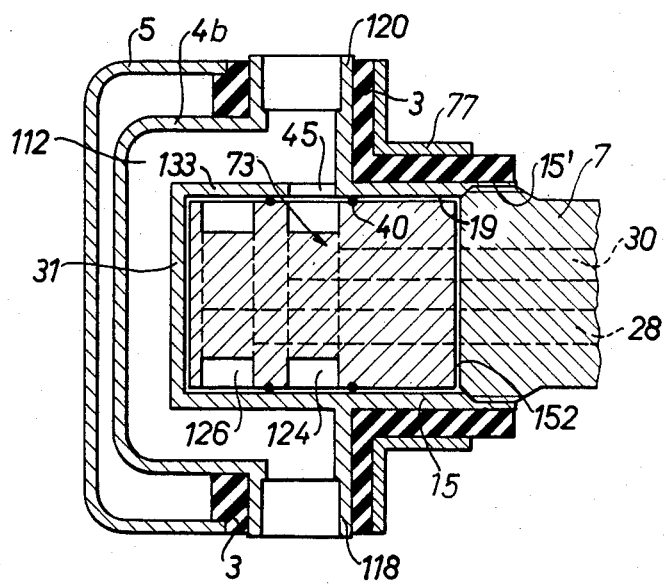
FIG. 15 is a sectional view along section line XV—XV in FIG. 19.
Figure 16:
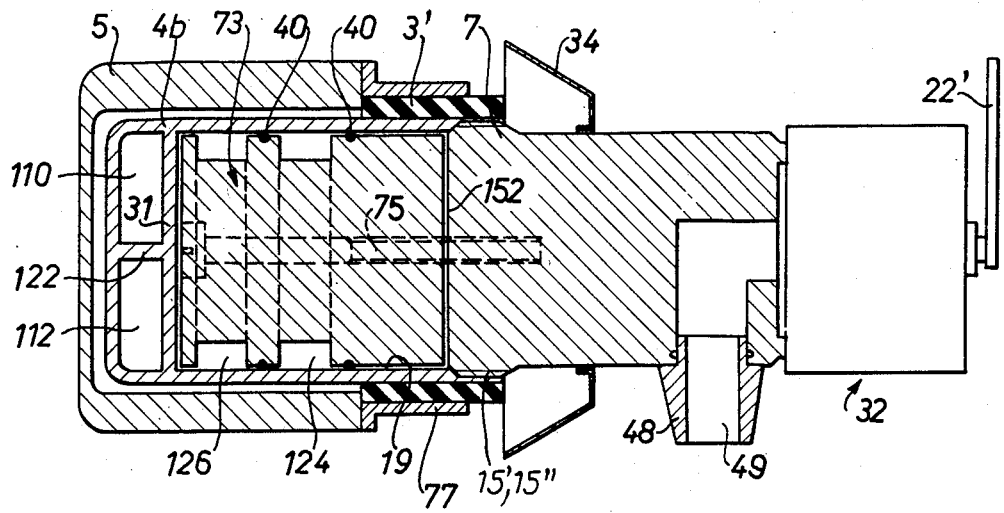
FIG. 16 is a sectional view along section line XVI—XVI in FIG. 19, wherein the fixture includes a separate water distributor section which is rotationally adjustable relative to the rest of the fixture when a connecting screw is loosened.
Figure 17:
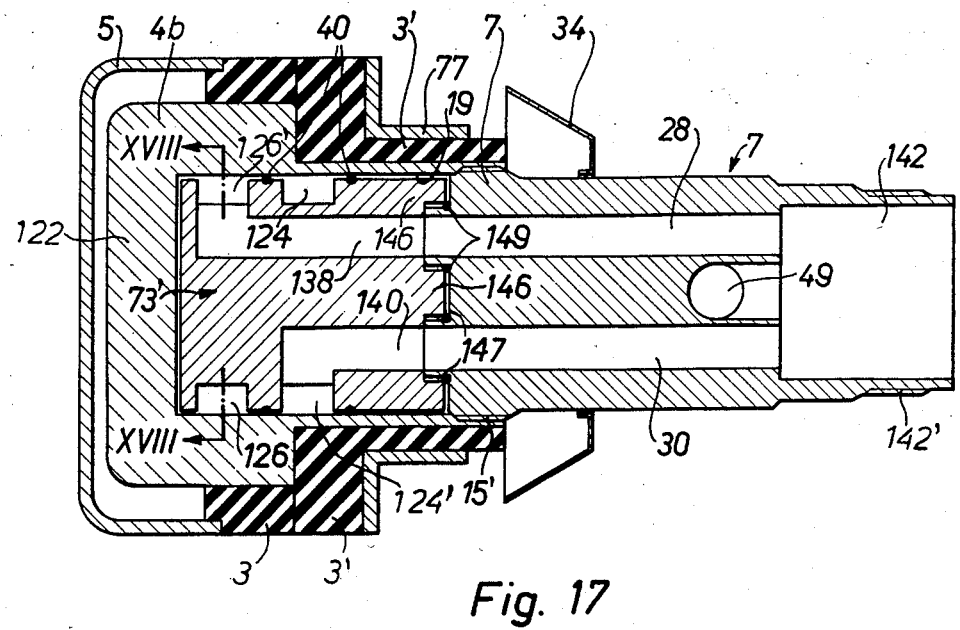
FIG. 17 is a sectional view along section line XVII—XVII in FIG. 19.

In the embodiments shown in FIGS. 14 to 19, the fitting member 4b is also provided with two inlet connecting pipe sections 114 and 118, as well as two outlet connecting pipe sections 116 and 120 similar to the embodiment shown in FIG. 12. However, in FIGS. 14 to 19, the hollow chambers between the inlet and outlet connecting pipe sections are formed differently. The inlet pipe section 114 is connected through a channel type chamber 110 to the outlet section 116 as shown in FIG. 14. The inlet section 118 is connected through a similar channel type chamber 112 to the outlet section 120 as shown in FIG. 15. These channel type chambers 110, 112 are separated by a partition wall 122 as shown in FIGS. 16, 17. The bottom wall 31 separates the chambers 110 and 112 from the bore 19 in the fitting member 4b. The housing 5 is constructed for concealed mounting inside a wall and it receives the fitting member 4b as illustrated in FIGS. 16 and 17. Here again, heat and noise insulating shells 3, 3' of soft rubber or foam type synthetic material are used for sealing the fitting member 4b in the housing 5.

In the embodiment of FIGS. 14 to 19 the fixture 7 is provided with a separate distribution section 73 or 73' as shown in FIG. 17. The distribution section 73, 73' has a cylindrical shape received in the bore 19 of the substantially cylindrical fitting member 4b and the distribution section 73, 73' is rotatable relative to the remaining portion of the fixture 7. In FIG. 16 the distribution section 73 is rotatable when a connecting screw 75 is loosened. After adjustment of the relative position of the distribution section 73, the screw 75 is tightened again. As in the other embodiments, the fitting member 4b has an inner threading 15' cooperating with an outer threading 15" of the fixture 7. The conventional mixing valve 32 operable by its handle 22' is secured to a pipe extension 142 of the fixture 7. For this purpose the extension 142 is provided with an external threading 142'. The mixed water discharge 49 is formed by a discharge member or nipple 48. The decorative cover 34 is used as described above.

Figure 19:
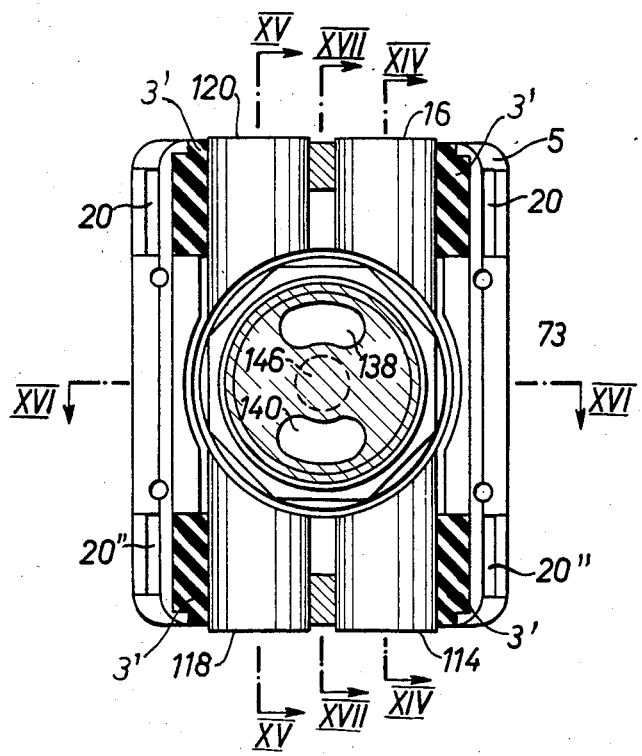
FIG. 19 is a sectional view along section line XIX—XIX in FIG. 14.

As best seen in FIG. 19, the inlet connecting pipe sections 114 and 118 are located in parallel to each other and so are the outlet pipe sections 116 and 120 and the respective channels 110 and 112 are located on diametrically opposite sides of the bore 19 in the fitting member 4b. The arrangement of the inlet and outlet sections is such that they are respectively aligned with each other and have, accordingly, a common axis. The chambers 110, 112 have a slight or flat U-shape to pass by the bottom 31 of the fitting member 4b.

As best seen in FIG. 17, the fixture 7 has longitudinal flow channels or ducts 28, 30 as in the above described embodiments. These ducts 28, 30 are in axial alignment with channels 138 and 140 in the distributor section 73, 73'. The channel 138 opens into a channel mouth 126' which communicates with a ring groove 126.

Similarly, the channel 140 has a channel mouth 124' communicating with a ring groove 124. The ring groove 124 in turn communicates with a port 45 in the inner jacket 133 of the fitting member 4b as best seen in FIG. 15. Similarly, the ring groove 126 communicates with a port 47 in the inner jacket 133 of the fitting member 4b as best seen in FIG. 14. The two ports 45 and 47 are axially displaced relative to each other and located on dimetrically opposite sides of the inner jacket 133 of the fitting member 4b. Thus, the distributor section 73 is rotatable relative to the fitting member 4b and relative to the housing 5 and relative to the armature 7 because in any rotational position there are throughflow passages established between the chamber 110 and the ring groove 126 on the one hand, and between the chamber 112 and the ring groove 124 on the other hand because the ports 45, 47 are axially, as well as circumferentially displaced relative to each other.

As seen in FIG. 17, it may be desirable to provide elements which define the relative rotational position between the distributor section 73' and the remainder of the fixture 7. For this purpose studs 146 cooperate with respective bores or holes 147 in such a way that the distributor section 73' can take up only two defined positions relative to the remainder of the fixture 7. A sealing ring 149 is provided in each of the bores or grooves 149. If only one stud or pin 146 is used, it will be located off-center for cooperation with two respective bores or grooves located dimetrically opposite each other. It does not matter whether the grooves are in one section of the fixture and the studs or pins in the other section or vice versa. This feature makes it possible to easily exchange the supply of hot or cold water to the ducts 28 or 30. As shown in FIG. 17, and assuming that the port 45 supplies the hot water, such hot water will pass into the duct 30. However, if the distributor section 73' is turned by 180°, the channel 140 will now be aligned with the duct 28 and the hot water will accordingly pass through the duct 28 while the cold water will pass through the duct 30 from the port 47.

Figure 18:
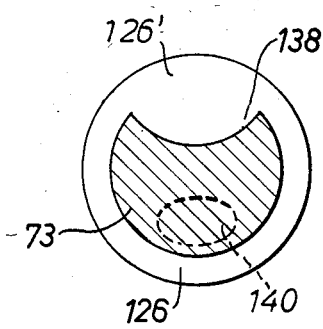
FIG. 18 is a sectional view along section line XVIII—XVIII in FIG. 17.
Figure 20:
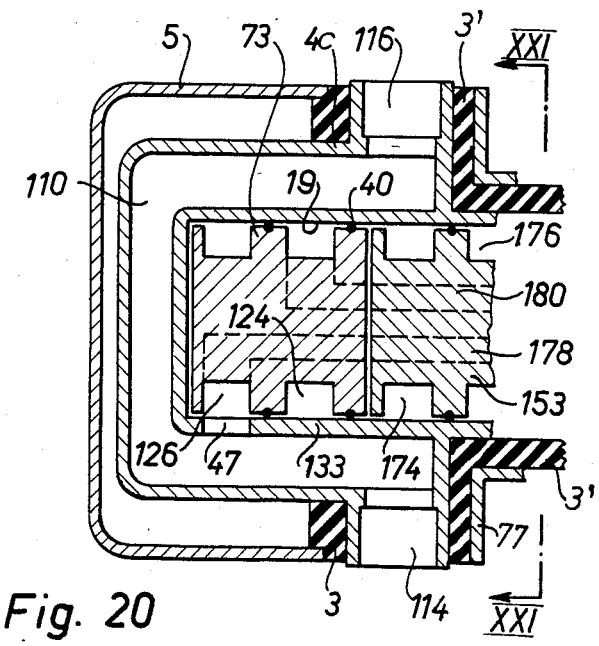
FIG. 20 is a sectional view along section line XX—XX in FIG. 21, and illustrating a further embodiment of the invention in which the fixture has two separately adjustable distributor members for additionally providing one or two mixed water outlets.
Figure 21:
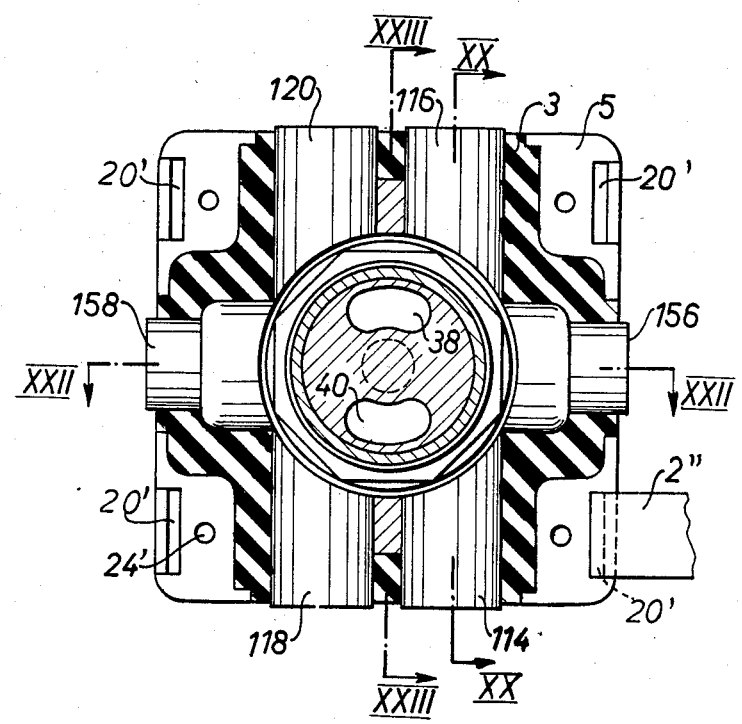
FIG. 21 is a sectional view along section line XXI—XXI in FIG. 20.

FIG. 18 shows that the duct 138 in the distributor section 73' has a somewhat crescent shaped configuration where it merges into the channel mouth 126' which in turn merges into the ring groove 126.

As in the embodiment of FIG. 12, the outlet connecting pipe section 116 and 120 in the embodiment of FIGS. 14 to 19 may also be directly connected to the plumbing pipes leading to the next fixture without the need for any cross over in the plumbing pipes. This is possible because the distributor 73 in the bore 19 is rotatable so that, if desired, it may be turned by 180°. Thus, it does not make any difference whether the hot water pipe for the next fixture must be located on the right or left side thereof. Additionally, it is possible to make sure that the discharge 49 can be adjusted to always point downwardly independently of the angular position of the housing 5. It is also assured that the hot water supply and the cold water supply may always be located in accordance with the requirements of local plumbing codes and in accordance with the requirements of the conventional mixing valve 32.

In other words, the just described features make it possible that the supply of the hot and cold water to the mixing valve 32 always takes place on the correct side. Another important advantage is seen in that the plumbing pipes may lead to the housing 5 at substantially any desired angle. The housing 5 may be made of synthetic material or of metal, as mentioned, and it is apparent that it is easily accessible from its front side, just as in the other embodiments according to FIGS. 1 to 8, and 12, 13, because the cover 77 is also secured to the housing 5 by screws not shown.

FIG. 19 shows slots 20" in the housing 5 for receiving mounting straps similar to those shown in FIGS. 3 and 4, however, with the bow section replaced by a straight section fitting into the slots 20". The slots may pass entirely through the housing or they may be made so that they reach into the housing from the front and back side as do the slots 20. Thus, it is possible that the respective mounting straps may be connected to the front side and/or to the rear side. A total of four such straps may be used. However, fewer straps may also be feasible.

Figure 27:
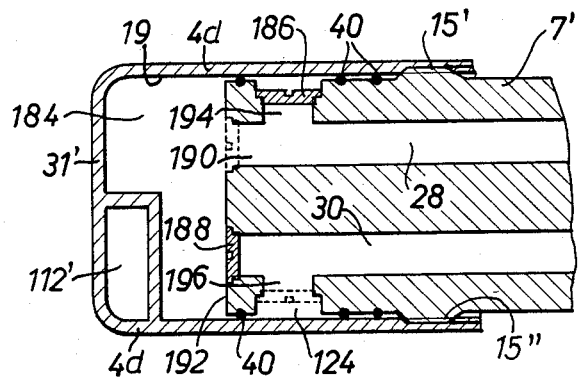
FIG. 27 is an axial sectional view through a modified fixture with a water distributor forming an integral component of the fixture.

FIG. 27 illustrates a modification of a fixture 7' in which the distributing features and the fixture proper form an integral unit, whereby again the distributor portion of the fixture is received in a bore 19 of a fitting member 4d. The fixture 7' is held by the cooperating threadings 15', 15" as described. The longitudinal duct 28 opens axially through its mouth 190 into a chamber 184 in the fitting member 4d. The bottom 31' of the fitting member 4d forms together with the facing end of the fixture 7' the chamber 184. The other chamber 112' in the fitting member 4d is closed off relative to the chamber 184 and communicates with the duct 30 through a cross bore 196 and a ring groove 124 which opens into a portion of the chamber 112' not seen in FIG. 27. Sealing rings 40 again seal the fixture 7' relative to the bore 19 and thus relative to the chambers 112', 184. The duct 30 also has an opening into the chamber 184. However, that opening is closed by a threaded plug 188. Similarly, the duct 28 is connectable to the ring groove 124 through a cross bore 194. However, that cross bore 194 is also closed by a threaded plug 186.

Using the threaded plug 188 for closing the opening 190 of the duct 28 and using the threaded plug 186 for closing the cross bore 196 will change the flow passages. In other words, in such a situation the duct 38 will open into the chamber 184 and the duct 28 will communicate with the chamber 112' through the cross-bore 194 and the ring groove 124. Thus, it is again easy to change the flow passages as has been described above with reference to FIGS. 14 to 19.

The just described switching with the aid of the plugs 186 and 188 so that the cold water duct in the fixture 7' becomes the hot water duct and vice versa may also be accomplished by keeping two different distributor fixtures 7' on hand. Actually, these fixtures would not be different, except for the different insertions of the plugs 186, 188.

FIGS. 20 to 25 illustrate a modification in which additionally to the outlet connecting pipe sections 116, 120 and to the inlet connecting pipe sections 114, 118, there are provided outlet connecting pipe sections 156 and 158 for supplying mixed water to a hand held shower and to a foot shower or the like. As far as applicable, the same reference numbers are being used in FIGS. 20 to 25 as have been used in the above description of the preceding figures. In FIGS. 20 to 25 there is, in addition to the first distributor 73 described above, a second distributor 153 forming part of the fixture 7 and interposed between the distributor 73 and the body of the remainder of the fixture 7. Hot and cold water is supplied to the mixing valve through the inlet connecting pipe sections 114 and 118. Water flowing, for example into the inlet section 114 passes into the chamber 110 and through the port 47 in the fitting member 4c into the ring groove 126 and then into the channel 138 which is aligned with the further channel 178 in the second distributor 153. The channel 178 communicates with the duct 28 to the mixing valve 32 secured to the front end 142 of the fixture 7. Additionally, the chamber 110 leads to the discharge pipe section 116. Actually, it does not make any difference which of the sections 114, 116 is referred to as the inlet or outlet section. The other inlet section 118 leads into the chamber 112, just as in FIG. 15. The chamber 112 communicates through the port 45 with the ring groove 124 and also with the outlet pipe section 120. The ring groove 124 communicates with the channel portion 140 which in turn communicate with the channel 180 in the second distributor section 153. The channel 180 leads into the duct 30 and thus to the mixing valve.

As best seen in FIG. 2, the channels 138, 178 and the duct 28 are arranged in axial alignment and so are the channels 140, 180 and the duct 30.

Figure 22:
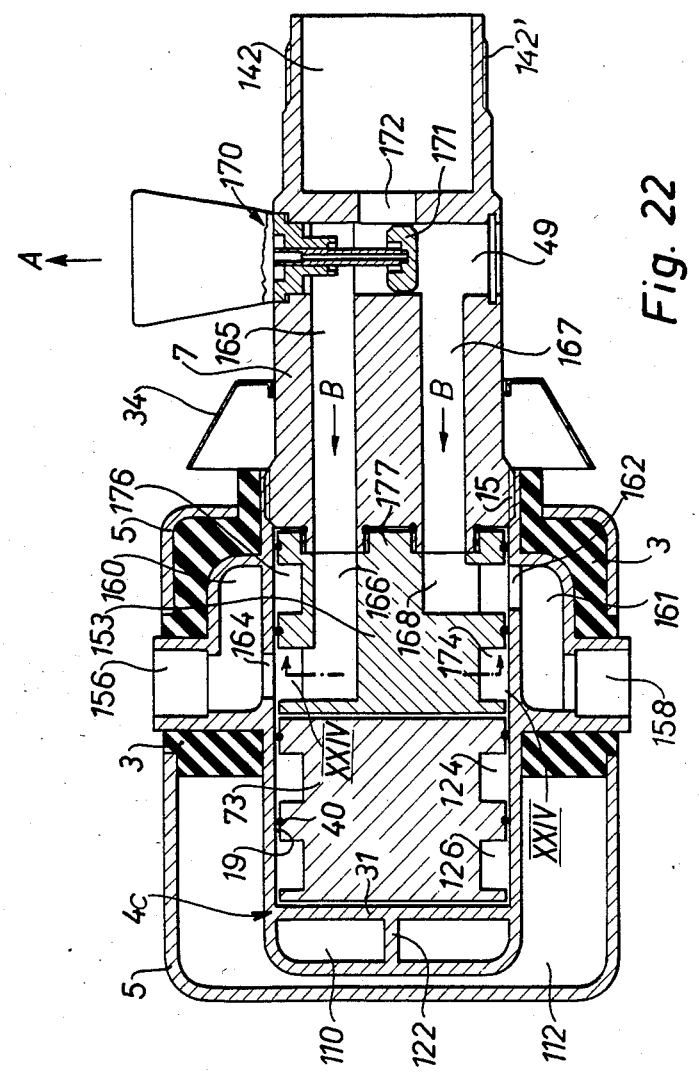
FIG. 22 is a sectional view along section line XXII—XXII in FIG. 21.

FIG. 22 shows how mixed water from the mixing valve 32, shown in FIG. 16 but not in FIG. 22, passes through a bore 172 to flow either through the duct 165 to the connecting pipe section 156 or to the connecting pipe section 158 depending on the position of a conventional valve 170 having a valve plug 171 to be pulled up or pushed down as indicated by the arrow A. The mixed water flows in a direction indicated by the arrows B in the ducts 165, 167 opposite to the flow direction of the hot and cold water in the ducts 28, 30. When the plug 171 is in the position shown in FIG. 22, the mixed water flows past the plug 171 through the duct 165, the channel 166, the port 164 into a chamber 160 in the fitting member 4c. The chamber 160 communicates with the connecting pipe section 156 which is, for example, connected through a flexible hose to a hand held shower not shown. Similarly, when the plug 171 is in an upward position, mixed water flows through bore 172 past the plug, through the duct 167, the channel 168, the port 162 into the chamber 161 which in turn communicates with the connecting pipe section 158 connected, for example, to a foot shower not shown. The channel 168 leads into a ring groove 174 communicating with the port 164 while the channel 168 leads into a ring groove 176 communicating with the port 162. The ring grooves 174 and 176 are axially displaced relative to each other and the ports 162 and 164 are preferably located diametrically opposite each other with an axial displacement matching that of the axial displacement of the ring grooves 174, 176.

Figure 23:
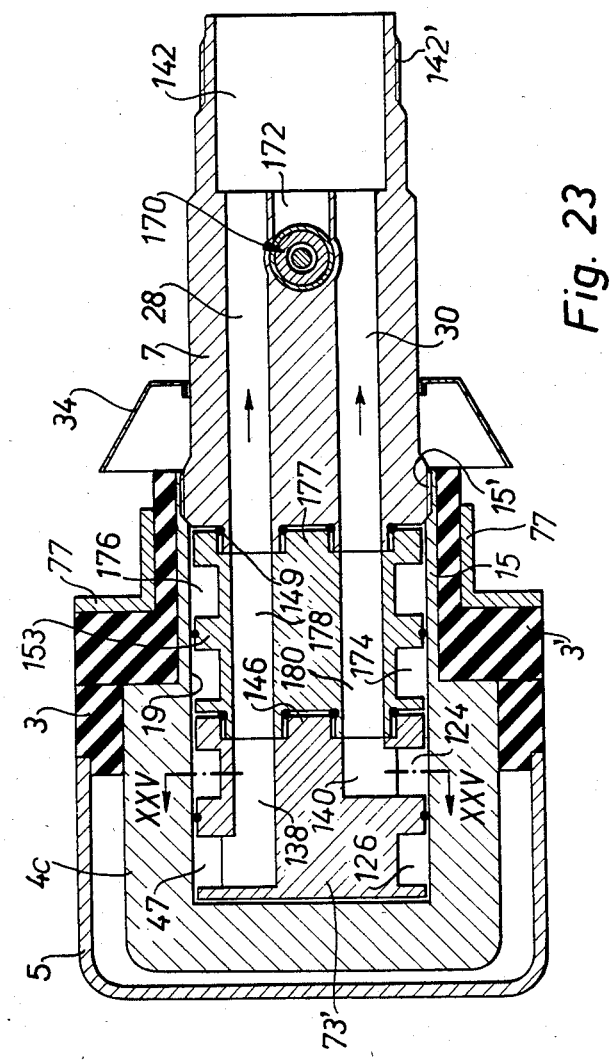
FIG. 23 is a sectional view along section line XXIII—XXIII in FIG. 21.
Figure 24:
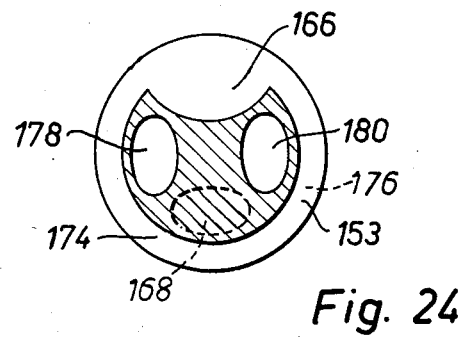
FIG. 24 is a sectional view along section line XXIV—XXIV in FIG. 22.

As seen in FIG. 23, the inlet distributor 73' is connected to the discharge distributor 153 through a stud or pin 146 cooperating with a respective groove as described above in more detail with reference to FIG. 17. Thus, in FIG. 23 the two distributors 73', 153 can be connected to each other only in two defined positions permitting a 180° turn. Similarly, between the discharge distributor 153 and the fixture 7 there is a stud or pin 177 reaching into a respective recess to perform the same function for a 180° rotational displacement between the fixture 7 and the discharge distributor 153. Here again, the two distributors and the remaining portion of the fixture 7 may be interconnected by a central screw 75 as shown in FIG. 16, but not in FIG. 23.

The discharge distributor section 153 makes it possible to switch or exchange the hot and cold water connections as has been explained in more detail above with reference to FIGS. 14 to 17. Additionally the section 153 makes it possible, if the valve 170 is in the down pushed position as shown in FIG. 22, to supply the mixed water to the discharge connecting pipe section 158 or 156 simply by rotating the discharge distributor section 153 by 180°.

Figure 29:
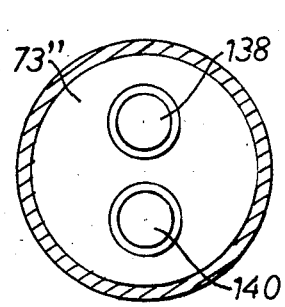
FIG. 29 is a sectional view along section line XXIX—XXIX in FIG. 26.
Figure 25:
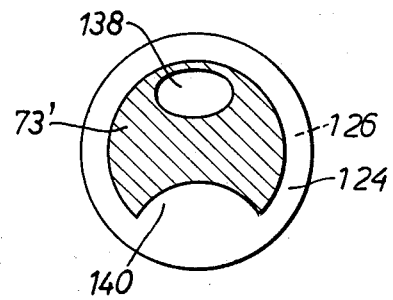
FIG. 25 is a sectional view along section line XXV—XXV in FIG. 23.
Figure 26:
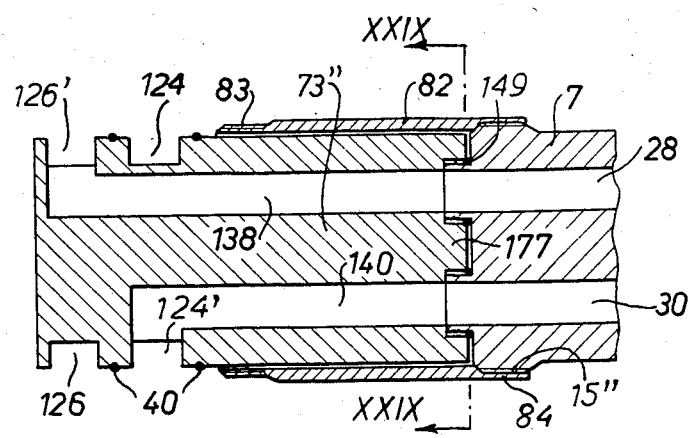
FIG. 26 is a sectional view through an armature similar to that shown in FIG. 16, however, showing a modified, somewhat differently constructed water distributor section which is adjustable relative to the remainder of the armature, whereby the function is the same as that in FIG. 16.

The embodiment of FIG. 26 is intended to make it possible to combine a fitting member 4b as shown in FIGS. 14 to 16 in combination with a fixture as shown in FIGS. 22 and 23 while omitting the intermediate discharge distributor section 153. For this purpose the inlet distributor section 73" is longer in the axial direction and the spacing between the shorter housing and fitting member 4b on the one hand and the shorter fixture 7 in FIGS. 22 and 23 is bridged by a bridging sleeve 82 engaging with its outer threading 83 into the inner threading 15' of the fitting member and with its inner threading 84 the threading 15" of the fixture 7. FIG. 29 shows an end view of the inlet distributor section 73".

Figure 28:
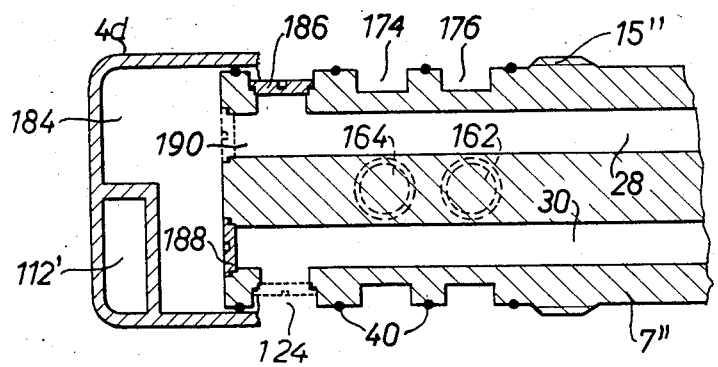
FIG. 28 is a sectional view through a further modified fixture with two water distributors forming integral components of the fixture.

FIG. 28 illustrates a modification comparable to that of FIG. 27, however, suitable for the connection of a hand held shower head or a foot shower through ports 162, 164, whereby the function is the same as described above with reference to FIGS. 20 to 25 taken in combination with FIG. 19. However, the distributor sections form integral parts of the fixture 7". Otherwise the same reference numbers are used in FIG. 28 as in the relevant FIGS. described above.

Incidentally, in the embodiments described above with reference to FIGS. 1 to 8 it is also possible to modify the fixture 7 in such a way that one of the longitudinal ducts 28 opens into the facing end and not into the ring groove 39. In other words, the insert section 7a of the fixture 7 could be cut off approximately in a plane defined by the intermediate sealing ring 40 between the ring grooves 37, 39. The fitting member 4 would then also be provided with a chamber 184 as shown in FIGS. 27 and 28. Only the ring groove 38 would be used in such a modification. The insert section 73' in FIG. 17 could be similarly modified. Thus, the channel 138 would open into the end face of the section 73' rather than into the ring groove 126 and the fitting member 4 would be provided with a chamber similar to chamber 184.

The connecting pipe sections 114, 116, 118, 120, 156, and 158 may be constructed for conventional soldered connections as they are used for copper piping or they may be provided with threadings for galvanized steel piping. Similarly, clamping connections may be employed for synthetic material piping as has been described with reference to FIGS. 9, 10 and 11.

Although the invention has been described with reference to specific example embodiments, it will be appreciated, that it is intended, to cover all modifications and equivalents within the scope of the appended claims.

What is claimed is:

1. A fitting for connecting a plumbing faucet to hot and cold water plumbing pipes (8, 9; 8a, 9a) for supplying hot and cold water to said faucet, comprising: a housing (5) having a central housing axis and a cavity (25) in said housing, a fixture (7) for mounting said faucet, a fitting member (4) operatively mounted in said housing for connecting said fixture (7) to said housing (5), said fixture (7) having separate cold and hot water ducts (28, 30), said fitting member (4) comprising respective hot and cold water chambers (12, 14) for communicating with said ducts (28, 30) and respective connecting pipe sections (11, 11') connecting said hot and cold water chambers (12, 14) to said hot and cold water plumbing pipes, said fitting member (4) further comprising a bore (19) extending substantially coaxially with said central housing axis, said fixture (7) being operatively received in said bore (19) for rotational adjustment into a position for fluid passing cooperation between said respective chambers in said fitting member (4) and the corresponding one of said ducts in said fixture (7), each of said hot and cold water ducts of said fixture having a respective duct inlet (36, 38) in said fixture (7), said duct inlets (36, 38) being axially displaced relative to each other with respect to said central axis for facilitating said cooperation, and sealing means (40) on said fixture (7) for separating said duct inlets (36, 38) from each other, said fitting member (4) comprising two axially spaced ports (45, 47) each port communicating through said hot and cold water chambers (12, 14) with said connecting pipe sections (11) and through said duct inlets (36, 38) with said ducts (28, 30) for providing fluid passages from said hot and cold water plumbing pipes to said faucet, a mixing valve unit (32) connected to ends of said ducts (28, 30) outside said fixture for selecting the desired temperature of the mixed water and for volume control, ring groove means beetween said fitting member (4) and said fixture (7) cooperating with said duct inlets (36, 38), said fixture 7 comprising a discharge port (49) for the mixed water outside said fitting member (4), said fitting member (4) and said fixture (7) with said discharge port (49) forming separate parts for permitting any desired rotational angular adjustment betweeen these parts, said fitting further comprising means for securing said fixture (7) in an angularly and axially adjusted position relative to said housing (5), and wherein said fixture (7) comprises a cylindrical insert section (7a) fitting into said bore (19) of said fitting member (4), said means for securing said fixture (7) fixing said cylindrical insert section (7a) radially and axially in said bore of said fitting member, said duct inlets (36, 38) of said fixture (7) being so constructed and located in said cylindrical insert section (7a) that the respective inlet duct (28, 30) remains in fluid communication with the corresponding port (45, 47) in said fitting member (4) in any angularly adjusted position of said cylindrical insert section (7a) of said fixture, said sealing means (40) comprising a number of sealing rings located around said cylindrical insert section (7a) so as to separate said duct inlets (36, 38) from each other in said cylindrical insert section (7a) of said fixture (7).

2. The fitting of claim 1, wherein said chambers (12, 14) in said fitting member (4) are located on diametrically opposite sides of said bore (19) in said fitting member (4) and substantially around said bore (19), wherein said duct inlets of said fixture (7) are located to open on diametrically opposite sides of said fixture (7) for cooperation with said chambers, and wherein said connecting pipe sections of said fitting member (4) form integral components of said fitting member (4) extending in parallel to each other and in a plane common to both said connecting pipe sections.

3. The fitting of claim 1, wherein said ring groove means comprise two ring grooves (37, 39) axially spaced from each other in said fixture (7), said ring grooves running around said fixture where said respective duct inlets (36, 38) are located, so that each duct inlet opens into its ring groove, said sealing means (40) separating said ring grooves from each other in a fluid tight manner, and wherein said duct inlets also communicate with said ports (45, 47) for providing fluid communication between said ports and said inlet ducts (28, 30).

4. The fitting of claim 1, wherein said housing (5) has an at least partially open facing side, said fitting further comprising removable cover means (46) for covering said at least partially open facing side of said housing where said connecting pipe sections (11, 11', 13, 13') are located, wherein said fitting further comprises a mounting assembly including a mounting ring (41) and at least one strap (2) extending radially away from said mounting ring, and screw means (24) accessible from said facing side of said housing for securing said mounting ring (41) to said facing side of said housing in any one of a plurality of angular positions relative to said central axis, and wherein said mounting assembly further comprises at least two insulating shells (3, 3') for locating said fitting member (4) in said housing (5), said insulating shells being separate from each other and contacting each other along a separation plane (18) for facilitating withdrawal of said fitting member (4) from said housing (5).

5. The fitting of claim 1, wherein said connecting pipe sections (11, 11') have a mouth with an internal non-circular cross-section, said fitting further comprising an insert bushing (50) having a respective non-circular section (58), a circular section, and a radially outwardly extending flange (52) between said circular and non-circular sections, said non-circular section (58) fitting into said mouth of non-circular cross-section of the respective connecting pipe section, a sealing ring (56) operatively located between said flange (52) and a facing surface of the respective connecting pipe section, an outer threading (60) on said connecting pipe section, and a sleeve nut (10) engaging said outer threading for operatively pressing said flange (52) against said sealing ring, and wherein said hot and cold water pipes (8, 9; 8a, 9a) comprise flexible pipes of plastic material into which said circular section of said insert bushing (50) reaches, said fitting further comprising a clamping sleeve (54) inserted in said sleeve nut (10) and surrounding the respective flexible pipe for securing said flexible pipe to said circular section and for simultaneously transmitting a force exerted by said sleeve nut onto said flange (52).

6. The fitting of claim 1, wherein said fixture (7) comprises a distributor section (73) for distributing hot and cold water, said distributor section (73) being operatively received in said bore (19) of said fitting member (4), said distributor section having conduits (138, 140) in operative alignment with said hot water and cold water ducts (28, 30) of said fixture, said conuits (138, 140) ending in a respective one of said duct inlets (36, 38) for said cooperation with said chambers in said fitting member, and wherein said distributor section (73) is a separate part of said fixture, said separate distributor section being mounted for rotation relative to the remainder of said fixture for alternately aligning one of said conduits (138, 140) with one or the other of said ducts (28, 30) in said fixture and vice versa for changing a hot flow passage into a cold flow passage and vice versa.

7. The fitting of claim 1, wherein said chambers of said fitting member (4) comprise two channels (110, 112) extending substantially in parallel to each other and respectively connected to the corresponding port (45, 47) in said fitting member (4) and to the respective connecting pipe section of said fitting member, wherein each of said two channels has a U-configuration and a connecting pipe section at each end whereby two connecting pipe sections are arranged in axial alignment with each other and so that the respective axis extends across said central axis and thus across a longitudinal axis of said fixture, wherein said fitting member (4) comprises, in addition to said first mentioned connecting pipe sections, two further connecting pipe sections (13, 13') located opposite said first mentioned connecting pipe sections (11, 11'), wherein the longitudinal axes of all of said connecting pipe sections are located in a common plane which extends substantially perpendicularly to said central housing axis, and wherein said first mentioned connecting pipe sections are inflow connecting pipe sections, and wherein said further connecting pipe sections are outflow connecting pipe sections for separately passing hot and cold water through the fitting member.

8. The fitting of claim 1, wherein said fixture (7) comprises first and second separable water distribution sections (73, 153) operatively inserted in said bore of said fitting member, said first and second water distribution sections being rotatably adjustable relative to each other and to said fixture, said fixture (7) further comprising, in addition to said first mentioned ducts (28, 30), two flow conduits (165, 167) separated from said first mentioned ducts for conveying mixed water in a flow direction opposite to the flow direction in said first mentioned ducts (28, 30), said first water distribution section (73) comprising two first ring grooves (124 and 126) for communicating with said chambers in said fitting member, said first and second water distribution sections (73, 153) comprising separate, axially alignable longitudinal first channels (138, 140; 178, 180) cooperating with said first ring grooves for communicating said ports with said ducts (28, 30) in said fixture through said first channels (138, 140; 178, 180), said fitting further comprising at least one outflow port (156 or 158) for supplying mixed water to a hand held shower or the like, said second water distribution section (153) comprising at least one second ring groove (174 or 176) communicating with said outflow port, and at least one second channel (166, 168) communicating with the respective mixed water flow conduit (165, 167) for supplying mixed water to said outflow port.

9. The fitting of claim 1, wherein said chambers (112, 184) are located in an end portion of said fitting member, said ducts (28, 30) in said fixture (7) extending toward a facing end of said fixture, said duct inlets having a threading in said facing end of said fixture, said fixture further having at least one circumferential groove (124), and two cross-bores (194, 196), each with a threading for connecting said circumferential groove to said ducts (28, 30), and two threaded plugs (186, 188) for closing one of said duct inlets and one of said cross-bores.

10. The fitting of claim 9, wherein said fixture comprises one or two distributor sections integrally formed as part of said fixture, said distributor section or sections being insertable in said fitting member.

11. The fitting of claim 1, wherein said fixture (7', 7'') has an insert section, operatively received in said bore with an end face, both of said separate longitudinal ducts (28, 30) having an opening through said end face of said insert section, one of said longitudinal ducts (28, 30) communicating with a chamber (184) at the facing end of said fixture (7', 7''), a plug (188) for closing the other of said longitudinal ducts (28, 30), said closed longitudinal duct having a lateral duct open in said ring groove (124), said open longitudinal duct also having a lateral duct (194) closed by a plug (186), whereby for changing a cold water connection to a warm water connection said open and closed ducts are changed and vice versa.

12. The fitting of claim 1, wherein said plumbing pipes (8a, 9a) are metal pipes having a sleeve (61) fixed to their outer free ends, said sleeve having a radially outwardly reaching shoulder (61') facing away from a facing end of said sleeve (61), said connecting pipe section (11, 11') having a facing end (62) and a radially outwardly facing threading, said fitting further comprising sleeve nut means (10) having an inwardly facing threading for engaging said outwardly facing threading and a radially inwardly extending flange for engaging said outwardly reaching shoulder (61'), said sealing ring (56) being inserted between said facing end (62) of said connecting pipe sections and the facing end of said sleeve (61), said sleeve nut (10) being slidable along said plumbing pipes for separating the plumbing pipes from said connecting pipe sections without any axial displacement of the plumbing pipes and of the connecting pipe sections facing said plumbing pipes.

* * * * *